United States Patent [19]

Easthope et al.

[11] 4,314,386
[45] Feb. 9, 1982

[54] METHOD OF MEAT TENDERIZING

[76] Inventors: Thomas C. Easthope, 41 Kootenay Crescent, Scarborough, Ontario; Robert R. Martin, 608 Brock St., South, Whitby, Ontario, both of Canada

[21] Appl. No.: 957,431

[22] Filed: Nov. 20, 1978

[51] Int. Cl.$^3$ .............................................. A22C 9/00
[52] U.S. Cl. .......................................... 17/51; 17/25; 99/532
[58] Field of Search ............... 17/51, 25; 99/532, 534, 99/516

[56] References Cited

U.S. PATENT DOCUMENTS

| | | | |
|---|---|---|---|
| 22,185 | 11/1858 | Marsh | 99/532 X |
| 1,951,436 | 3/1934 | Paddock | 99/532 X |
| 1,994,459 | 3/1935 | Beisser | 99/532 X |
| 4,053,963 | 10/1977 | Matheu | 17/51 X |

Primary Examiner—Willie G. Abercrombie

[57] ABSTRACT

"Method of Meat Tenderizing", is a tenderizing process in which a calculated amount of wine, spirit or suitable permeable solution, relative to the size of the dead animal i.e. rabbit, sheep, cattle, swine, deer, moose and the like is injected into the vascular system under pressure from a pump apparatus when the animal is in a post mortem state of primary flacidity and prior to any debleeding or mutilation of parts via a major artery and the intra-vascular pressure is allowed to build until the venous system is distended and at that point a major vein is opened and allowed to drain. The solution is continually pumped through the vascular system until all the blood is flushed from the system. The process is completed once the arterial, capillary and venous systems are flushed and saturated with wine, spirits or suitable permeable solution and the animal is eviscerated and the carcass is allowed to hang at 38° F., while the wine, spirits or suitable permeable solution is allowed to react on the tissue resulting in a thorough tenderizing of the meat for eatable purposes.

1 Claim, 1 Drawing Figure

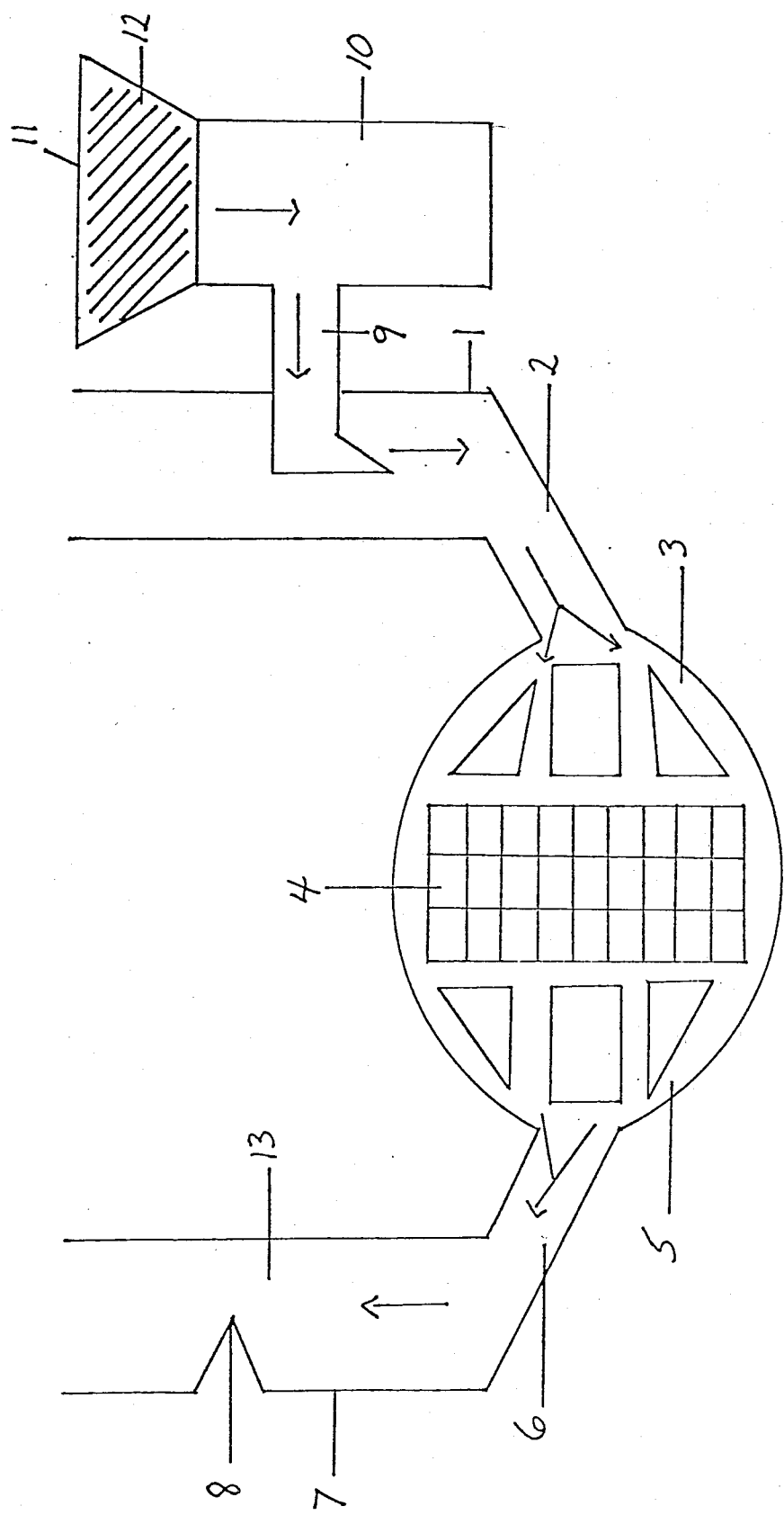

METHOD OF MEAT TENDERIZING

The invention, "Method of Meat Tenderizing", relates to a completely thorough tenderizing process of meat by means of injection via the vascular system.

Most meat today is tenderized externally by soaking or marinading the meat in wine or other substances. The inefficiency of this method is obvious. The method only allows for surface tenderizing which is very crude or patchy and uncontrollable. The tenderizing substance has to diffuse on the ability of its own chemical agents, without the aid of pressure or vascular pathways.

Other methods of tenderizing meat are by injecting a saline solution into the meat by a series of needles. This method is more like an intra-muscular process and again is very crude and localized compared to our process.

Our invention is related to and is an improvement over certain prior art patents where animals are injected via the vascular system following a chilling process and after rigor mortis has set in. Allowing rigor mortis to set in causes vascular constriction, which hampers circulation and distribution of the tenderizing substances.

Our invention is related to and is an improvement over certan prior art patents where the animal's vascular system is debleeded and or the hind legs are removed at the knee joint or any other mutilation prior to injection, other than the original incision to raise the vessels for injection. Fluid taking the path of least resistance, this latter method, hampers distribution and penetration to distal parts of the animal, which causes massive leakage, which fails to obtain an intra-vascular pressure because of a severing in the vascular circuit which fails to produce a complete circulation of the solution.

The advantages and objects of our invention will become apparent upon full consideration of the following detailed description and accompanying simplified drawing in which, The FIGURE shows a drawing of a portable pump apparatus connected to an artery tube, which is shown inserted into an artery, which in turn leads to the remainder of the systemic circulatory system found in most mammals.

Our invention, "Method of Meat Tenderizing," is a tenderizing process which begins once the animal is knocked over and is in a post mortem state of primary flacidity, which is prior to rigor mortis. There is no unnecessary mutilation performed on the carcass at this point to destroy or diminish the intra-vascular pressure, other than making a incision about three inches in length adjacent to a major artery or vein.

Now referring to the accompanying drawing, an artery tube 9 is inserted into a major artery 1. Wine, spirit or a suitable permeable solution 12 held in the holding tank 11 is injected under varying pressure via a portable pump 10 through the artery tube 9 pushing the blood 13 ahead of it through the major artery 1, through the arteriole system 2, through the capilliary beds 3, through the intra-cellular spaces 4, through the capilliary beds 5, through the venules 6, and into the major vein 7. Once distention of the vacular system is obtained the major vein 7, is opened and allowed to drain 8. The wine, spirits or suitable permeable solution is continually pumped through the system until the vascular system is completely flushed of blood. The animal then is eviscerated and allowed to hang while the wine, spirits or suitable permeable solution is allowed to react on the tissue.

The advantage of this method, results from the complete penetration of all the tissue because there is no unnecessary mutilation of limbs to cause a break down in the circulatory system to cause leakage; therefore, the intra-vascular pressure is not released, but maintained, which would affect the complete penetration of the intra-cellular spaces prior to injection. The major vein is not opened prior to injection which would also cause the intra-vascular pressure to be sustained. If the intra-vascular pressure were diminished at this point it would defeat the penetration of the complete system. The animal's carcass is injected during the post mortem state of primary flacidity, which occurs prior to rigor mortis, otherwise if rigor mortis is present the vascular pathways are in a state of constriction, which hampers circulation. The body temperature of the animal dissipates more rapidly by the introduction of a cold solution being injected into the system, which also aids in tenderizing. By using wine or spirits as a solution, it makes the taste of the meat more palatable for human consumption. This process also allowed older animals with tougher cuts of meat to be used for human consumption.

The embodiments of the invention in which exclusive property or privilege are claimed are defined as follows:

1. A method of tenderizing meat in the form of a carcass in the state of primary flacidity, free of rigor mortis and free of any form of mutilation, other than the point of injection, comprising the steps of injecting wine under pressure into a major artery while blood in the arteries and veins is allowed to drain via a major vein, after an intra-vascular pressure has been obtaned, under pressure of the injected wine thus replacing blood in all blood vessels of the animal's carcass, resulting in a complete penetration of wine in all body areas previously supplied by blood and then allowing the carcass to stand at 38° F. until the wine has reacted on the tissue resulting in a thorough tenderizing of the meat.

* * * * *